/ Patented May 25, 1954

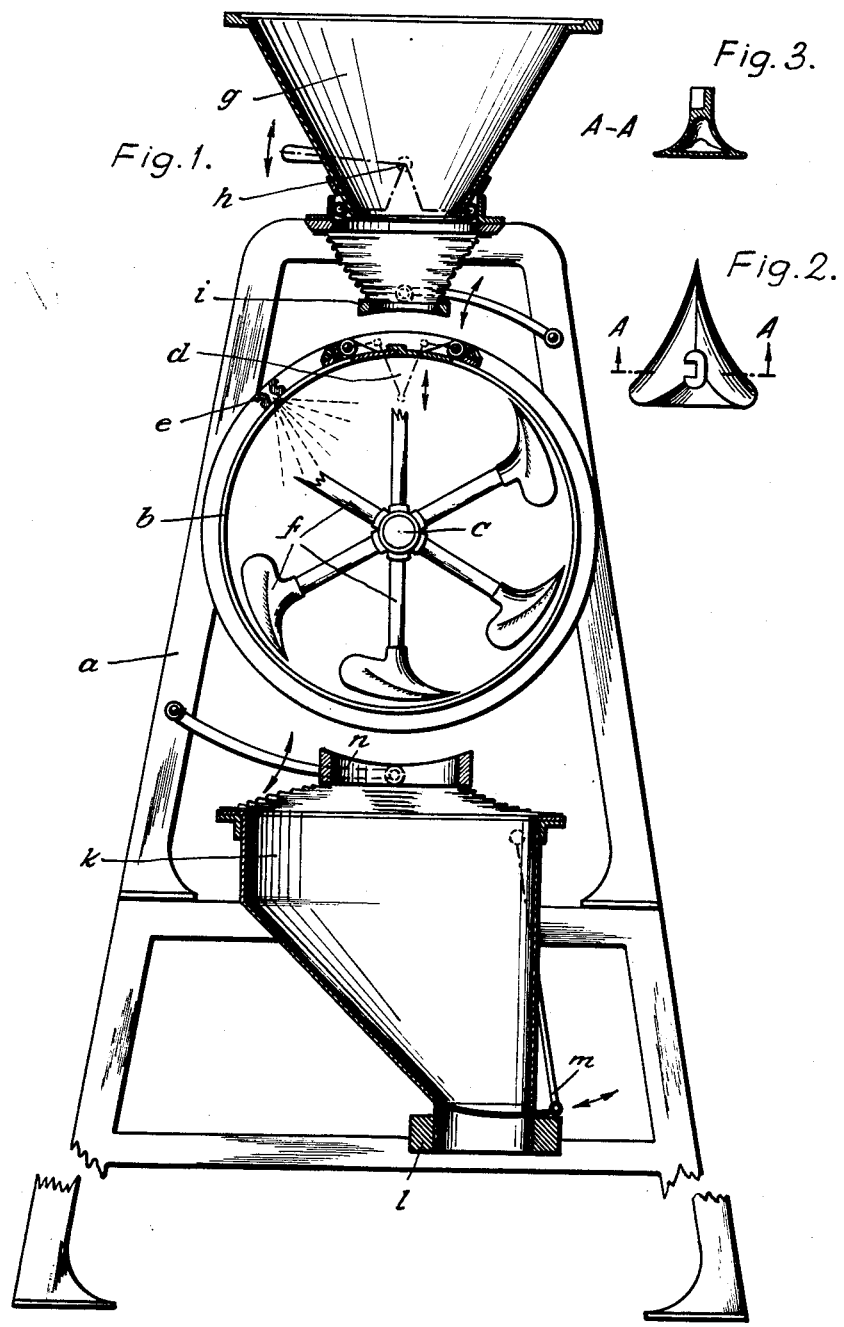

2,679,385

UNITED STATES PATENT OFFICE 2,679,385

MIXING APPARATUS

Wilhelm Lödige and Fritz Lödige,
Paderborn, Germany

Application August 27, 1951, Serial No. 243,896

7 Claims. (Cl. 259—9)

This invention relates to mixing apparatus.

In some known mixing apparatus employing a mixing drum, the material to be mixed is rolled or whirled round, without the use of agitating gear, by rotating the mixing vessel. In other types of apparatus the material to be mixed is conveyed upwardly in the vessel from below by a screw conveyor arranged therein. It then overflows and drops down to the bottom of the vessel; it is then again carried up by the screw conveyor. Finally, other mixing apparatus is known in which stirring gear is arranged in a stationary vessel or in a vessel which is rotatable about a vertical axis, such stirring gear drawing the material on the bottom of the vessel through an elliptical or the like path.

These known mixing apparatus are only suitable for certain materials to be mixed. If used for mixing fibrous material, the stirring gear will completely fail due to compacting of the material.

In contradistinction to the known mixing apparatus above referred to, the present invention provides a mixing apparatus comprising a stationary or rotatable vessel adapted to be closed and rendered dust-tight and containing an agitating and centrifugally acting means which is rotatable at a higher speed than that of the mixing vessel, said means including scoops or the like distributed spirally about an axis extending parallel to the casing and so shaped or constructed that they skim off material to be mixed from the wall of the mixing vessel and throw it as by centrifugal action in all directions.

The agitating and centrifugal means of the above described kind is driven about the said axis at a predetermined speed to suit the material to be mixed, the specially constructed scoops or the like picking up from the wall of the mixing vessel the material to be mixed and throwing it in all directions. As a result, a large part of the material constantly settles on the surface of the mass of material and at short intervals is again picked up by the various, successively acting scoops in order to become re-distributed in all directions.

If the mixing vessel is slowly rotated, the material to be mixed is in addition rolled along. In order, in the case of stationary mixing vessels, to obtain proper admixture in the minimum mixing time, the internal agitating and centrifugal means is driven at a higher speed so that the material on the wall of the mixing vessel is violently carried along at such high speed by the agitating and centrifugal scoops, thus ensuring that the material to be mixed is not allowed to remain settled at any part of the mixing vessel. With this mixing apparatus the reseparation of the mixed material into its components cannot occur, even with material having substantial differences in granulation, batches and quantities. The mixing period is only 1–8 minutes.

In carrying the invention into effect according to one form, the mixing apparatus may be provided with supplementary parts as follows:

1. Inlet orifices in the drum of the mixing vessel to enable fluid to be admitted to the material while being whirled around by the internal agitating and centrifugal devices when the vessel is stationary.

2. An upper filling hopper with a base formed as a two-part drop valve adapted to be actuated by a hand lever.

3. A dust-excluding passage from the outlet of the filling hopper to the filling opening of the mixing vessel, said passage comprising flexible material having a rigid frame at its lower end and adapted normally to be elevated, and being capable of being pressed around the opening of the mixing vessel within the two-part valve for filling purposes.

One example of the invention suitable, for instance, for mixing pulverised, granular and fibrous material is illustrated in the accompanying drawings, in which:

Fig. 1 is a side sectional elevation of the mixing apparatus.

Fig. 2 is a plan view of a scoop.

Fig. 3 is a sectional elevation of the line A—A, Fig. 2.

A mixing vessel $b$ is mounted on a frame $a$ and is adapted to be held stationary or to be rotated about the axis $c$ of the agitating and centrifugal devices. A single-part or two-part valve $d$ is provided on the mixing vessel upon rotation of which the valve may be positioned at an upper filling position or at a lower discharge position. The drum of the mixing vessel $b$ is provided with one or more orifices $e$ adapted to be opened and closed and through which fluid may be admitted to the material being whirled around by the inner agitating and centrifugal devices which are made to rotate when the mixing vessel $b$ is held stationary. The axis $c$ carries a plurality of spirally distributed arms to the ends of which agitating and centrifugally acting scoops $f$ are secured. These scoops $f$ are each shaped similar to a ploughshare. They are adapted to fling the material towards the ends of the mixing vessel and towards the middle thereof. These scoops are made hollow as clearly shown in Fig. 3.

A filling hopper $g$ is fixedly or movably mounted on the upper part of the frame. The floor of this hopper $g$ comprises a single part or a two-part valve $h$. A movable dust-excluding passage $i$ leading to the mixing vessel is arranged below the filling hopper $g$ and comprises a bellows of flexible material having a rigid frame at its lower edge to form a sealing member around the filling opening of the mixing vessel. A discharge hopper $k$ is disposed below the mixing vessel and has one or more bottom outlets $l$ which are adapted to be closed by a sliding valve $m$. A movable dust-excluding passage $n$ is provided at the upper edge of the discharge hopper $k$ and, in a similar manner to the passage $i$, is composed of a flexible bellows having an upper rigid frame which forms a seal when pressed into engagement with the casing of the mixing vessel. This passage $n$ excludes dust when the contents of the vessel $b$ are discharged into the hopper $k$.

In operation, the material to be mixed is introduced into the filling hopper $g$ and is transferred through the dust-excluding passage $i$ into the mixing vessel $b$ when the valve $d$ is open. After the mixing operation, the material is discharged through the lower dust-excluding passage $n$ into the hopper $k$.

In applying the invention to small mixers, the various supplementary parts $g$ to $n$ may be dispensed with, in which case the filling and emptying of the material through the opening in the mixing vessel may be effected in a dust-free manner by using special containers adapted to be pressed or applied to the vessel opening, this being facilitated since the mixing vessel may be rotated to present the opening to an upper or lower position.

I claim:

1. A granular, fibrous and pulverulent material mixing apparatus including a vessel for containing material to be mixed and rotatable agitating and impelling means within said vessel for mixing said material, said means comprising double-sided ploughshare-like elements each of which is tapered towards its front end and each comprising a substantially triangularly shaped body having a peripheral face and two side faces of continuously smooth surfaces, the said peripheral face being convex and tapered in the direction of its front end, and the said side faces being concave and symmetrically disposed.

2. The apparatus, as set forth in claim 1, in which the said mixing vessel has its axis horizontally disposed and which includes a closable filling opening in the periphery of the said vessel, means supporting said vessel for rotation, a rotatable shaft extending through the said vessel along its axis, at least one additional closable orifice in the said vessel for injection of fluid into the material therein to be mixed, and the said agitating and impelling means being carried by the said shaft.

3. The mixing apparatus, as set forth in claim 1, in which the forward and narrower end of each ploughshare-like element is closer to the inner peripheral surface of the vessel than the rearward end of the said element.

4. The apparatus, as set forth in claim 1, in which the said peripheral face and the said two side faces of the said substantially triangularly shaped body constitute the outer faces of a peripheral plate and of two side plates, respectively, the said side plates serving as deflectors for impelling material picked up from the inner periphery of the said vessel.

5. The mixing apparatus, as set forth in claim 2, which includes radial arms extending from the said shaft and distributed in spiral fashion thereabout and the said agitating and impelling elements being disposed at the end of each of the said arms.

6. As an article of manufacture, a mixing element for a machine for mixing granular, fibrous and pulverulent material, comprising a shaft and a double-sided ploughshare-like scoop secured to the said shaft and rotatable therewith, each of the said scoops comprising a substantially triangularly shaped body having a peripheral face and two side faces of continuously smooth surfaces, the said peripheral face being convex and tapered in the direction of its front end, and the said side faces being concave and symmetrically disposed.

7. The apparatus, as set forth in claim 1, which includes means for rotating said agitating and impelling means and means for rotating the said mixing vessel at a lower speed than that of the said agitating and impelling means.

References Cited in the file of this patent

UNITED STATES PATENTS

| Number | Name | Date |
| --- | --- | --- |
| 8,841 | McKinlay | Mar. 30, 1852 |
| 277,319 | Miller | May 8, 1883 |
| 1,483,048 | Sturtevant | Feb. 5, 1924 |
| 2,018,082 | Muench et al. | Oct. 22, 1935 |
| 2,108,502 | Muench | Feb. 15, 1938 |
| 2,109,077 | Straight | Feb. 28, 1938 |